(12) United States Patent
Schenck

(10) Patent No.: US 10,537,863 B2
(45) Date of Patent: Jan. 21, 2020

(54) CONSTRICTOR VALVE WITH WEBBING, CEMENTITIOUS SLURRY MIXING AND DISPENSING ASSEMBLY, AND METHOD FOR MAKING CEMENTITIOUS PRODUCT

(71) Applicant: United States Gypsum Company, Chicago, IL (US)

(72) Inventor: Ronald E. Schenck, Valparaiso, IN (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 58 days.

(21) Appl. No.: 15/296,874

(22) Filed: Oct. 18, 2016

(65) Prior Publication Data

US 2017/0189872 A1    Jul. 6, 2017

Related U.S. Application Data

(60) Provisional application No. 62/273,980, filed on Dec. 31, 2015.

(51) Int. Cl.
*F16K 7/06* (2006.01)
*F16K 7/08* (2006.01)
(Continued)

(52) U.S. Cl.
CPC ........ *B01F 15/0293* (2013.01); *B01F 3/1207* (2013.01); *B01F 15/00337* (2013.01);
(Continued)

(58) Field of Classification Search
CPC ..................................... F16K 7/06; F16K 7/08
(Continued)

(56) References Cited

U.S. PATENT DOCUMENTS

| 1,500,452 A | 7/1924 | Haggerty |
| 2,207,339 A | 7/1940 | Camp |

(Continued)

FOREIGN PATENT DOCUMENTS

| CN | 2464523 Y | 12/2001 |
| EP | 210352 A1 | 2/1987 |

(Continued)

OTHER PUBLICATIONS

European Patent Office, International Search Report and the Written Opinion in International Application No. PCT/US2016/067416 (dated Mar. 29, 2017).

(Continued)

*Primary Examiner* — David L Sorkin
(74) *Attorney, Agent, or Firm* — Leydig, Voit & Mayer, Ltd.; Philip T. Petti; Pradip K. Sahu

(57) ABSTRACT

A constrictor valve can be associated with a conduit in fluid communication with a mixer to control a flow of cementitious slurry discharged from the mixer through the conduit. The constrictor valve can include a constrictor housing, a webbing constriction assembly, and a drive mechanism. The webbing constriction assembly includes a pair of rotatable members rotatably mounted to the constrictor housing and a plurality of webbing straps connected to the rotatable members and wrapped around the conduit. The drive mechanism includes a drive shaft and a gear assembly configured to rotate the rotatable members in opposing winding directions in response to the drive shaft rotating in a tighten direction to wrap the webbing straps tighter around the conduit to compress it and to rotate in opposing unwinding directions in response to the drive shaft rotating in a loosen direction to loosen the grip of the webbing straps on the conduit.

14 Claims, 7 Drawing Sheets

(51) Int. Cl.
  *B01F 15/02* (2006.01)
  *B01F 3/12* (2006.01)
  *B01F 15/00* (2006.01)
  *C04B 11/00* (2006.01)
  *B28C 5/00* (2006.01)
  *B28C 7/16* (2006.01)

(52) U.S. Cl.
  CPC ........ *B01F 15/00487* (2013.01); *B28C 5/003* (2013.01); *B28C 7/16* (2013.01); *C04B 11/00* (2013.01); *F16K 7/06* (2013.01); *B01F 2215/0047* (2013.01)

(58) Field of Classification Search
  USPC .................................................. 251/4, 248
  See application file for complete search history.

(56) References Cited

U.S. PATENT DOCUMENTS

| | | |
|---|---|---|
| 2,253,059 A | 8/1941 | Camp |
| 2,516,029 A | 7/1950 | Norman |
| 2,663,467 A * | 12/1953 | Douglass .................. F16K 7/08 222/507 |
| 2,940,505 A | 6/1960 | Nellie |
| 2,985,219 A | 5/1961 | Summerfield |
| 3,173,663 A | 3/1965 | Schoonover |
| 3,329,390 A | 7/1967 | Hulsey |
| 3,343,818 A | 9/1967 | Plemons et al. |
| 3,359,146 A | 12/1967 | Lane et al. |
| 3,383,131 A * | 5/1968 | Rosfelder .............. E21B 25/06 175/240 |
| 3,791,617 A | 2/1974 | Press |
| 4,009,062 A | 2/1977 | Long |
| 4,176,972 A | 12/1979 | Stiling |
| 4,184,771 A | 1/1980 | Day |
| 4,279,673 A | 7/1981 | White et al. |
| 4,288,263 A | 9/1981 | Delcoigne et al. |
| 4,354,885 A | 10/1982 | White |
| 4,364,790 A | 12/1982 | Delcoigne et al. |
| 4,412,669 A | 11/1983 | Hanyu |
| 4,439,913 A | 4/1984 | Coquillart |
| 4,523,737 A * | 6/1985 | Wentworth .............. F16K 7/08 251/213 |
| 4,612,766 A | 9/1986 | Eder |
| 4,812,045 A | 3/1989 | Rivers |
| 4,820,053 A | 4/1989 | Rivers |
| 4,836,149 A | 6/1989 | Newbold |
| 4,995,729 A | 2/1991 | Eberhardt et al. |
| 5,071,257 A | 12/1991 | Hasenpath et al. |
| 5,320,677 A | 6/1994 | Baig |
| 5,326,033 A | 7/1994 | Anfindsen |
| 5,401,588 A | 3/1995 | Garvey et al. |
| 5,643,510 A | 7/1997 | Sucech |
| 5,683,635 A | 11/1997 | Sucech et al. |
| 5,714,001 A | 2/1998 | Savoly et al. |
| 5,718,797 A | 2/1998 | Phillips et al. |
| 5,769,389 A | 6/1998 | Jacobsen et al. |
| 6,001,496 A | 12/1999 | O'Haver-Smith |
| 6,019,919 A | 2/2000 | Sulzbach et al. |
| 6,059,444 A | 5/2000 | Johnson et al. |
| 6,158,677 A | 12/2000 | Coles |
| 6,193,408 B1 | 2/2001 | Miura et al. |
| 6,342,284 B1 | 1/2002 | Yu et al. |
| 6,494,609 B1 | 12/2002 | Wittbold et al. |
| 6,505,810 B2 | 1/2003 | Abromaitis |
| 6,632,550 B1 | 10/2003 | Yu et al. |
| 6,695,278 B2 | 2/2004 | Ellis |
| 6,774,146 B2 | 8/2004 | Savoly et al. |
| 6,800,131 B2 | 10/2004 | Yu et al. |
| 6,874,930 B2 | 4/2005 | Wittbold et al. |
| 6,923,421 B2 | 8/2005 | Raftis |
| 7,007,914 B2 | 3/2006 | Petersen et al. |
| 7,296,919 B2 | 11/2007 | Petersen et al. |
| 7,811,413 B2 | 10/2010 | Hennis et al. |
| 8,475,762 B2 | 7/2013 | Li et al. |
| 9,238,105 B2 | 1/2016 | Lee |
| 2002/0014607 A1 | 2/2002 | Abromaitis |
| 2002/0016607 A1 | 2/2002 | Bonadio |
| 2002/0045074 A1 | 4/2002 | Yu et al. |
| 2004/0231916 A1 | 11/2004 | Englert et al. |
| 2005/0019618 A1 | 1/2005 | Yu et al. |
| 2005/0092944 A1 * | 5/2005 | Patterson .................. F16K 7/08 251/4 |
| 2006/0035112 A1 | 2/2006 | Veeramasuneni et al. |
| 2007/0022913 A1 | 2/2007 | Wang et al. |
| 2008/0236690 A1 | 10/2008 | Murakami et al. |
| 2012/0068381 A1 | 3/2012 | Troke |
| 2013/0233880 A1 | 9/2013 | Rago et al. |
| 2013/0248740 A1 | 9/2013 | Landry |
| 2014/0196418 A1 | 7/2014 | Agostini |
| 2015/0231799 A1 | 8/2015 | Wittbold et al. |
| 2015/0315074 A1 | 11/2015 | Ueno et al. |

FOREIGN PATENT DOCUMENTS

| | | |
|---|---|---|
| EP | 574722 B1 | 12/1993 |
| FR | 363365 A | 7/1906 |
| FR | 1221730 A | 6/1960 |
| GB | 363365 A | 12/1931 |
| GB | 1392941 A | 5/1975 |
| JP | 43-23366 Y1 | 10/1968 |
| JP | 43-27262 Y | 11/1968 |
| JP | 47-27847 B | 7/1972 |
| JP | S50-122727 A | 9/1975 |
| JP | 52-132423 U | 10/1977 |
| JP | 53-096527 A | 8/1978 |
| JP | 54-122323 A | 9/1979 |
| JP | 57-003556 A | 1/1982 |
| JP | S58-106675 U | 7/1983 |
| JP | 62-041474 A2 | 2/1987 |
| JP | 62-149678 A | 7/1987 |
| JP | 04-136573 A | 5/1992 |
| JP | 2001-004044 A | 1/2001 |
| JP | 2002-231668 A | 8/2002 |
| JP | 2003-314714 A | 11/2003 |
| JP | 2005-147375 A | 6/2005 |
| SU | 319780 | 12/1971 |
| TW | 215622 | 11/1993 |
| WO | WO 02/092307 A1 | 11/2002 |

OTHER PUBLICATIONS

International Bureau of WIPO, International Preliminary Report on Patentability in International Application No. PCT/US2016/067416 (dated Jul. 3, 2018).

* cited by examiner

CONSTRICTOR VALVE WITH WEBBING, CEMENTITIOUS SLURRY MIXING AND DISPENSING ASSEMBLY, AND METHOD FOR MAKING CEMENTITIOUS PRODUCT

CROSS-REFERENCE TO RELATED APPLICATION

This patent application claims the benefit of priority to U.S. Provisional Patent Application No. 62/273,980, filed Dec. 31, 2015, and entitled, "Constrictor Valve With Webbing, Cementitious Slurry Mixing and Dispensing Assembly, and Method for Making Cementitious Product," which is incorporated in its entirety herein by this reference.

BACKGROUND

The present disclosure relates to continuous board manufacturing processes and, more particularly, to an apparatus, system and method for controlling the dispensing of a cementitious slurry in connection with the manufacture of a cementitious article.

In many types of cementitious articles, set gypsum (calcium sulfate dihydrate) is often a major constituent. For example, set gypsum is a major component of end products created by use of traditional plasters (e.g., plaster-surfaced internal building walls), and also in faced gypsum board employed in typical drywall construction of interior walls and ceilings of buildings. In addition, set gypsum is the major component of gypsum/cellulose fiber composite boards and products, as described in U.S. Pat. No. 5,320,677, for example. Also, many specialty materials, such as materials useful for modeling and mold-making, produce products that contain major amounts of set gypsum. Typically, such gypsum-containing cementitious products are made by preparing a mixture of calcined gypsum (calcium sulfate alpha or beta hemihydrate and/or calcium sulfate anhydrite), water, and other components, as appropriate to form cementitious slurry. In the manufacture of cementitious articles, the cementitious slurry and desired additives are often blended in a continuous mixer, as described in U.S. Pat. No. 3,359,146, for example.

In a typical cementitious article manufacturing process such as wallboard, gypsum board is produced by uniformly dispersing calcined gypsum (commonly referred to as "stucco") in water to form aqueous calcined gypsum slurry. The aqueous calcined gypsum slurry is typically produced in a continuous manner by inserting stucco and water and other additives into a mixer which contains means for agitating the contents to form a uniform gypsum slurry. The slurry is continuously directed toward and through a discharge outlet of the mixer and into a discharge conduit connected to the discharge outlet of the mixer. Aqueous foam can be combined with the aqueous calcined gypsum slurry in the mixer and/or in the discharge conduit. A stream of foamed slurry passes through the discharge conduit from which it is continuously deposited onto a moving web of cover sheet material supported by a forming table.

The foamed slurry is allowed to spread over the advancing web. A second web of cover sheet material is applied to cover the foamed slurry and form a sandwich structure of a continuous wallboard preform, which is subjected to forming, such as at a conventional forming station, to obtain a desired thickness.

The calcined gypsum reacts with the water in the wallboard preform and sets as a conveyor moves the wallboard preform down a manufacturing line. The wallboard preform is cut into segments at a point along the line where the preform has set sufficiently. The segments are flipped over, dried (e.g., in a kiln) to drive off excess water, and processed to provide the final wallboard product of desired dimensions. The aqueous foam produces air voids in the set gypsum, thereby reducing the density of the finished product relative to a product made using a similar slurry but without foam. Prior devices and methods for addressing some of the operational problems associated with the production of gypsum wallboard are disclosed in commonly-assigned U.S. Pat. Nos. 5,683,635; 5,643,510; 6,494,609; 6,874,930; 7,007,914; and 7,296,919, which are incorporated by reference.

Prior apparatuses for addressing some of the operational problems associated with dispensing a cementitious slurry include a pinch-type valve which can be mechanically operated or operated by compressed air or hydraulics to pinch down on the elastomeric conduit. The pinch valve typically deforms the conduit into a flattened or rectangular orifice which can be susceptible to plugging by cementitious slurry that builds up in the corners of the orifice, where the flow velocity is lower, and sets. Further, the inlet and outlet orifices of the pinch valve are abrupt because pressure is exerted on the conduit in a substantially singular plane and does not allow for a gradual transition. Such abrupt entrances and exits can lead to further plugging of slurry producing equipment, which causes costly downtime for repairs.

U.S. Pat. No. 7,007,914 is entitled, "Slurry Mixer Constrictor Valve," and is directed to an apparatus and method for controlling the flow of a slurry. The constrictor valve includes first and second guide plates that are spaced a distance apart along the length of a conduit. Each of a plurality of rigid elongate members has first and second ends engaged on, and extending between, the first and second guide plates, respectively. Upon rotation of at least one of the first and second guide plates, the elongate members are configured to impart pressure on, and constrict the conduit.

It will be appreciated that this background description has been created by the inventors to aid the reader and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims and not by the ability of any disclosed feature to solve any specific problem noted herein.

SUMMARY

In one aspect, the present disclosure is directed to embodiments of a constrictor valve for use in making a cementitious product. In embodiments, a constrictor valve can be a part of a cementitious slurry mixing and dispensing assembly. The constrictor valve can be a part of a discharge conduit in fluid communication with a mixer. The constrictor valve can be used to control a flow of cementitious slurry discharged from the mixer.

In one embodiment, a constrictor valve is provided for selectively constricting a resiliently flexible conduit in a gypsum slurry dispensing apparatus. The constrictor valve includes a constrictor housing, a webbing constriction assembly, and a drive mechanism.

The constrictor housing defines a first conduit opening and a second conduit opening. The first and second conduit openings are in spaced relationship to each other along a longitudinal axis defined therebetween.

The webbing constriction assembly includes a first rotatable member, a second rotatable member, and a plurality of webbing straps. The first and second rotatable members are rotatably mounted to the constrictor housing such that the first and second rotatable members are rotatable about the longitudinal axis. The first and second rotatable members are in spaced relationship to each other along the longitudinal axis. The webbing straps are connected to the first and second rotatable members.

The drive mechanism includes a drive shaft and a gear assembly. The drive shaft defines a shaft axis. The drive shaft is rotatably movable about the shaft axis in a tighten direction and a loosen direction. The loosen direction is in opposing relationship to the tighten direction. The gear assembly is arranged with the drive shaft and the first and second rotatable members such that the gear assembly is configured to rotate the first and second rotatable members in opposing first and second winding directions about the longitudinal axis in response to the drive shaft rotating in the tighten direction and to rotate the first and second rotatable members in opposing first and second unwinding directions about the longitudinal axis in response to the drive shaft rotating in the loosen direction. The first and second winding directions are in opposing relationship to the first and second unwinding directions, respectively.

In another aspect of the present disclosure, embodiments of a slurry mixing and dispensing assembly are described. In one embodiment, a slurry mixing and dispensing assembly includes a mixer and a slurry dispensing apparatus.

The mixer includes a housing and an agitator disposed within the housing. The housing has an outlet. The agitator is configured to agitate water and a cementitious material to form an aqueous cementitious slurry.

The slurry dispensing apparatus includes a resiliently flexible conduit and a constrictor valve. The conduit defines a slurry passage. The conduit is connected to the mixer such that the slurry passage is in fluid communication with the outlet. The constrictor valve is mounted to the conduit. The constrictor valve includes a constrictor housing, a webbing constriction assembly, and a drive mechanism.

The constrictor housing defines a first conduit opening and a second conduit opening. The first and second conduit openings are in spaced relationship to each other along a longitudinal axis defined therebetween. The conduit extends through the first and second conduit openings.

The webbing constriction assembly includes a first rotatable member, a second rotatable member, and a plurality of webbing straps. The first and second rotatable members are rotatably mounted to the constrictor housing such that the first and second rotatable members are rotatable about the longitudinal axis. The first and second rotatable members are in spaced relationship to each other along the longitudinal axis. The webbing straps are connected to the first and second rotatable members. The webbing straps are wrapped around the conduit.

The drive mechanism is configured to rotate the first and second rotatable members in opposing first and second winding directions about the longitudinal axis to wrap the webbing straps tighter around the conduit to thereby compress the conduit and to rotate the first and second rotatable members in opposing first and second unwinding directions about the longitudinal axis to loosen the wrapping of the webbing straps about the conduit. The first and second winding directions are in opposing relationship to the first and second unwinding directions, respectively.

In another aspect of the present disclosure, embodiments of a method of making a cementitious product are described.

In one embodiment of a method of making a cementitious product, water and a cementitious material are agitated in a mixer to form an aqueous cementitious slurry. A flow of the aqueous cementitious slurry is discharged from the mixer into a slurry passage defined within a conduit. A portion of the conduit is constricted using a constrictor valve to change at least a part of the shape of the slurry passage within the portion of the conduit. The constrictor valve includes a constrictor housing, a webbing constriction assembly, and a drive mechanism.

The constrictor housing defines a first conduit opening and a second conduit opening. The first and second conduit openings are in spaced relationship to each other along a longitudinal axis defined therebetween. The conduit extends through the first and second conduit openings.

The webbing constriction assembly includes a first rotatable member, a second rotatable member, and a plurality of webbing straps. The first and second rotatable members are rotatably mounted to the constrictor housing such that the first and second rotatable members are rotatable about the longitudinal axis. The first and second rotatable members are in spaced relationship to each other along the longitudinal axis. The webbing straps are connected to the first and second rotatable members. The webbing straps are wrapped around the conduit.

The drive mechanism is configured to rotate the first and second rotatable members in opposing first and second winding directions about the longitudinal axis and to rotate the first and second rotatable members in opposing first and second unwinding directions about the longitudinal axis. The first and second winding directions are in opposing relationship to the first and second unwinding directions, respectively. The constricting of the portion of the conduit is effected by operating the drive mechanism to rotate the first and second rotatable members in the opposing first and second winding directions to wrap the webbing straps tighter around the conduit to thereby compress the conduit.

Further and alternative aspects and features of the disclosed principles will be appreciated from the following detailed description and the accompanying drawings. As will be appreciated, the constrictor valves, slurry mixing and dispensing assemblies, and techniques for making a cementitious product disclosed herein are capable of being carried out and used in other and different embodiments, and capable of being modified in various respects. Accordingly, it is to be understood that both the foregoing general description and the following detailed description are exemplary and explanatory only and do not restrict the scope of the appended claims.

Figure 1:
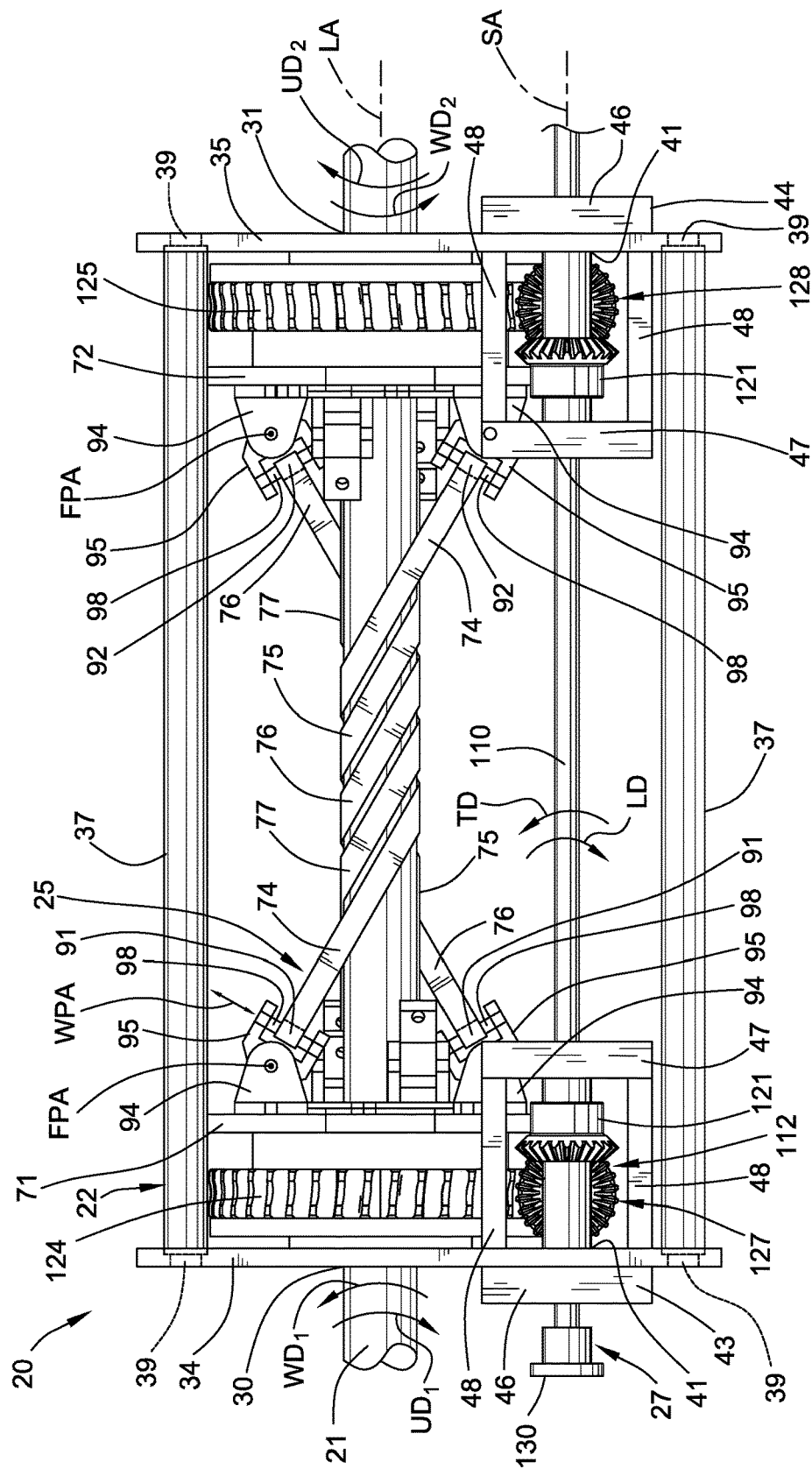
FIG. 1 is a top plan view of an embodiment of a constrictor valve with webbing constructed in accordance with principles of the present disclosure.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood that this disclosure is not limited to the particular embodiments illustrated herein.

DETAILED DESCRIPTION OF EXEMPLARY EMBODIMENTS

The present disclosure provides various embodiments of a constrictor valve that can be used in the manufacture of products, including cementitious products such as gypsum wallboard, for example. Embodiments of a constrictor valve constructed in accordance with principles of the present disclosure can be used in a manufacturing process to effectively control the flow of cementitious slurry through a flexible conduit, for example.

The present disclosure provides various embodiments of a cementitious slurry mixing and dispensing assembly that can be used in the manufacture of different types of cementitious product as will be appreciated by one skilled in the art. In embodiments, a cementitious slurry mixing and dispensing assembly constructed according to principles of the present disclosure can be used to make a cementitious board, such as, a gypsum wallboard, an acoustical panel, or a portland cement board, for example.

Embodiments of a cementitious slurry mixing and dispensing assembly constructed in accordance with principles of the present disclosure can be used to mix constituent materials to form a cementitious slurry (e.g., an aqueous calcined gypsum slurry) and to deposit the cementitious slurry onto an advancing web (e.g., paper or mat) moving on a conveyor during a continuous board (e.g., gypsum wallboard) manufacturing process. In one embodiment, a slurry mixing and dispensing assembly includes a mixer and a slurry dispensing apparatus having a constrictor valve constructed according to principles of the present disclosure. The mixer is configured to agitate a cementitious material and water to form an aqueous cementitious slurry. The slurry dispensing apparatus includes a resiliently flexible conduit which in fluid communication with the mixer and defines a slurry passage configured to convey the cementitious slurry therethrough. In one aspect, a constrictor valve constructed in accordance with principles of the present disclosure can be operably arranged with the conduit to control the flow of gypsum slurry therethrough.

The cementitious slurry can be any conventional cementitious slurry, for example any cementitious slurry, such as those commonly used to produce gypsum wallboard; acoustical panels including, for example, acoustical panels described in U.S. Patent Application Publication No. 2004/0231916; or portland cement board, for example. As such, the cementitious slurry can further comprise any additive that is commonly used in the production of cementitious products. Such additives include structural additives, including mineral wool, continuous or chopped glass fibers (also referred to as fiberglass), perlite, clay, vermiculite, calcium carbonate, polyester, and paper fiber, and chemical additives, including foaming agents, fillers, accelerators, sugar, enhancing agents (such as phosphates, phosphonates, borates and the like), retarders, binders (such as starch and latex), colorants, fungicides, biocides, hydrophobic agent (such as a silicone-based material, including a silane, siloxane, or silicone-resin matrix, e.g.), and the like. Examples of the use of some of these and other additives are described, for instance, in U.S. Pat. Nos. 6,342,284; 6,632,550; 6,800,131; 5,643,510; 5,714,001; and 6,774,146; and U.S. Patent Application Publication Nos. 2002/0045074; 2004/0231916; 2005/0019618; 2006/0035112; and 2007/0022913.

Non-limiting examples of cementitious materials include portland cement, sorrel cement, slag cement, fly ash cement, calcium alumina cement, water-soluble calcium sulfate anhydrite, calcium sulfate α-hemihydrate, calcium sulfate β-hemihydrate, natural, synthetic or chemically-modified calcium sulfate hem ihydrate, calcium sulfate dihydrate ("gypsum," "set gypsum," or "hydrated gypsum"), and mixtures thereof. In one aspect, the cementitious material desirably comprises calcined gypsum (sometimes referred to as, "stucco"), such as in the form of calcium sulfate alpha hemihydrate, calcium sulfate beta hem ihydrate, and/or calcium sulfate anhydrite. The calcined gypsum can be fibrous in some embodiments and nonfibrous in other embodiments. In embodiments, the calcined gypsum can include at least about 50% beta calcium sulfate hemihydrate. In other embodiments, the calcined gypsum can include at least about 86% beta calcium sulfate hem ihydrate. The weight ratio of water to calcined gypsum can be any suitable ratio, although, as one of ordinary skill in the art will appreciate, lower ratios can be more efficient because less excess water will remain after the hydration process of the stucco is completed to be driven off during manufacture, thereby conserving energy. In some embodiments, the cementitious slurry can be prepared by combining water and calcined gypsum in a suitable water to stucco weight ratio for board production depending on products, such as in a range between about 1:6 and about 1:1, e.g., about 2:3.

In embodiments, a constrictor valve constructed in accordance with principles of the present disclosure includes a constrictor housing, a webbing constriction assembly, and a drive mechanism. The webbing constriction assembly includes a pair of rotatable members rotatably mounted to the constrictor housing and a plurality of webbing straps connected to the rotatable members and configured to be wrapped around a flexible conduit. The drive mechanism includes a drive shaft and a gear assembly configured to rotate the rotatable members in opposing winding directions in response to the drive shaft rotating in a tighten direction to wrap the webbing straps tighter around the conduit to compress it and to rotate in opposing unwinding directions in response to the drive shaft rotating in a loosen direction to loosen the grip of the webbing straps on the conduit. Embodiments of a constrictor valve constructed in accordance with principles of the present disclosure can advantageously be configured as a retrofit component of a cementitious slurry mixing and dispensing assembly, such as one in an existing wallboard manufacturing system, for example.

In embodiments, a constrictor valve constructed according to principles of the present disclosure can be used in embodiments of a method for making a cementitious product for controlling the flow of a cementitious slurry including the feature of using such a constrictor valve on a slurry mixing and dispensing assembly. For example, the mixer can be used to mix and agitate calcined gypsum and water to form an aqueous calcined gypsum slurry. The aqueous calcined gypsum slurry can be discharged through a discharge outlet of the mixer to the dispensing apparatus. The dispensing apparatus preferably includes an elongate, flexible conduit which provides additional space for the uniform mixing of slurry. By providing the constrictor valve on the flexible conduit, a back-pressure can be selectively created within the conduit and into the mixer, causing an increase in the volume of aqueous calcined gypsum slurry within the mixer when the conduit is constricted. Unwanted setting of gypsum upstream of the constrictor valve can be reduced when the conduit is constricted so that occurrences of lumps can be diminished.

Turning now to the Figures, an embodiment of a constrictor valve 20 constructed according to principles of the present disclosure is shown in FIGS. 1-6. The constrictor valve 20 is suitable for use in embodiments of a slurry mixing and dispensing assembly following principles of the present disclosure. In embodiments, the constrictor valve 20 can be configured to control a flow of cementitious slurry dispensed from a mixer into a flexible conduit 21 such that the pressure within the conduit 21 upstream of the constrictor valve 20 is regulated.

Referring to FIG. 1, the illustrated constrictor valve 20 includes a constrictor housing 22, a webbing constriction assembly 25, and a drive mechanism 27. The constrictor housing 22 is configured to support the webbing constriction assembly 25 and the drive mechanism 27. The webbing constriction assembly 25 is configured to constrict the resiliently flexible conduit 21 about which the webbing constriction assembly 25 is associated. The drive mechanism 27 is configured to selectively operate the webbing constriction assembly 25 to exert compressive pressure upon the resiliently flexible conduit 21 about which the webbing constriction assembly 25 is wrapped to constrict a slurry passage defined within the conduit 21. The constrictor valve 20 is configured to variably reduce the flow of cementitious slurry through the slurry passage of the conduit 21 to thereby increase the pressure drop as material flows through the constricted orifice within the slurry passage defined by the tightening of the webbing constriction assembly 25. The drive mechanism 27 is also configured to selectively loosen the grip that the webbing constriction assembly 25 has on the conduit 21 to allow the size of the slurry passage within the conduit 21 to expand, causing the pressure drop across the portion of the conduit 21 with which the constrictor valve 20 is associated to decrease.

In embodiments, the conduit 21 is made from any suitable resiliently flexible material, such as a suitable elastomeric material (Tygon® tubing or the like, e.g.), and is of sufficient strength and flexibility that, upon being subjected to radial compressive pressure, is capable of being reduced in size to approximately one-half the original diameter. In embodiments, any conduit tubing exhibiting elastic properties can be used, and further, any reduction in slurry passage size that does not detrimentally affect the integrity of the conduit 21 is contemplated. Preferably, the conduit 21 has a cross-sectional diameter in a range between one inch and three inches and has a wall thickness of approximately ¼-inch. However, in other embodiments, other cross-sectional diameters and wall thicknesses can be used to suit the intended application. Exemplary factors which can influence the particular thickness and configuration of the conduit 21 employed include, among other things, the thickness of the wallboard being produced, the amount of slurry required, the distance between the mixer, the mixer outlet, and the forming plate, and the particular characteristics of the slurry formulation, including the setting rate, the water/stucco ratio, glass fiber usage and the percentage of foam desired.

Figure 2:
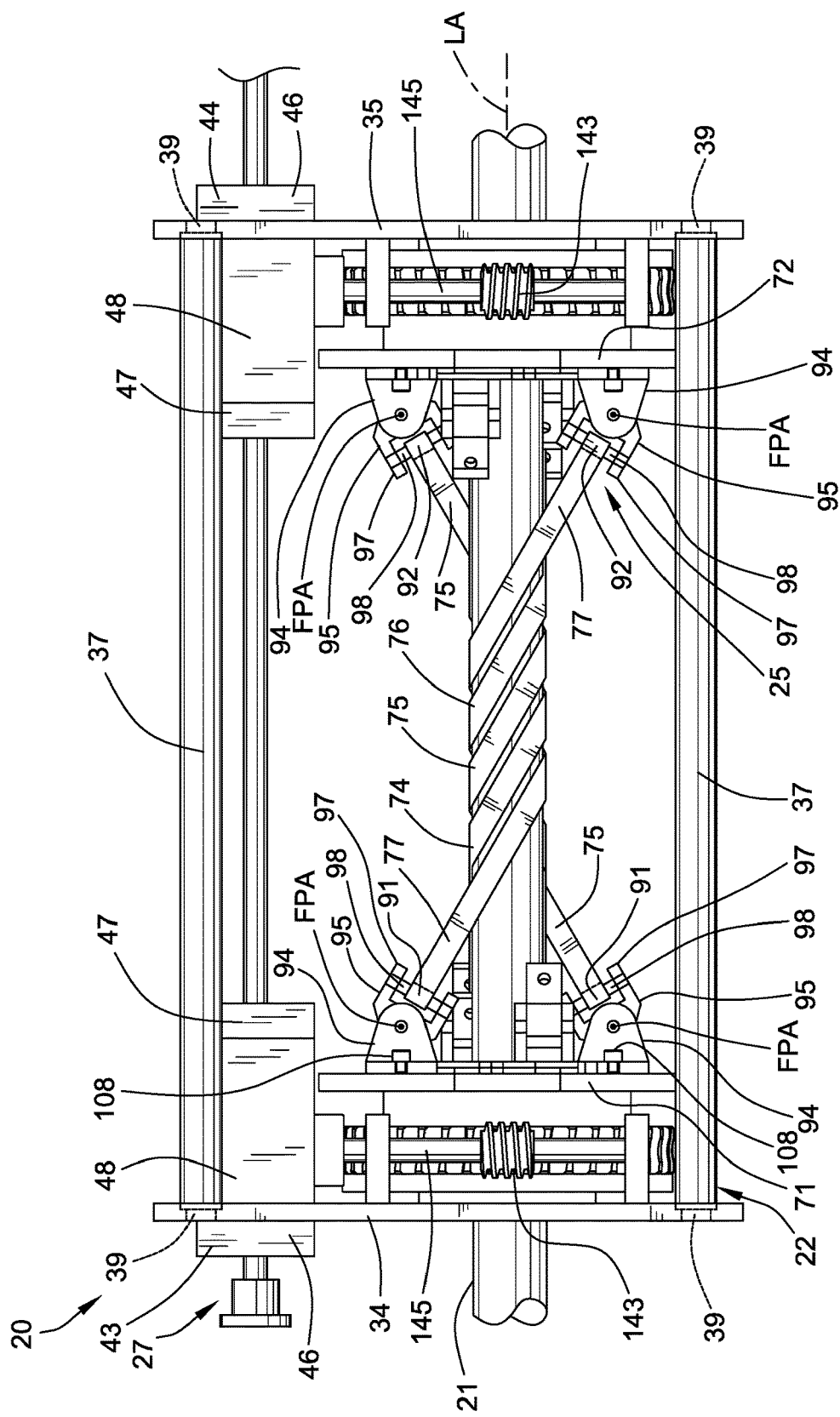
FIG. 2 is a side elevational view of the constrictor valve of FIG. 1.
Figure 3:
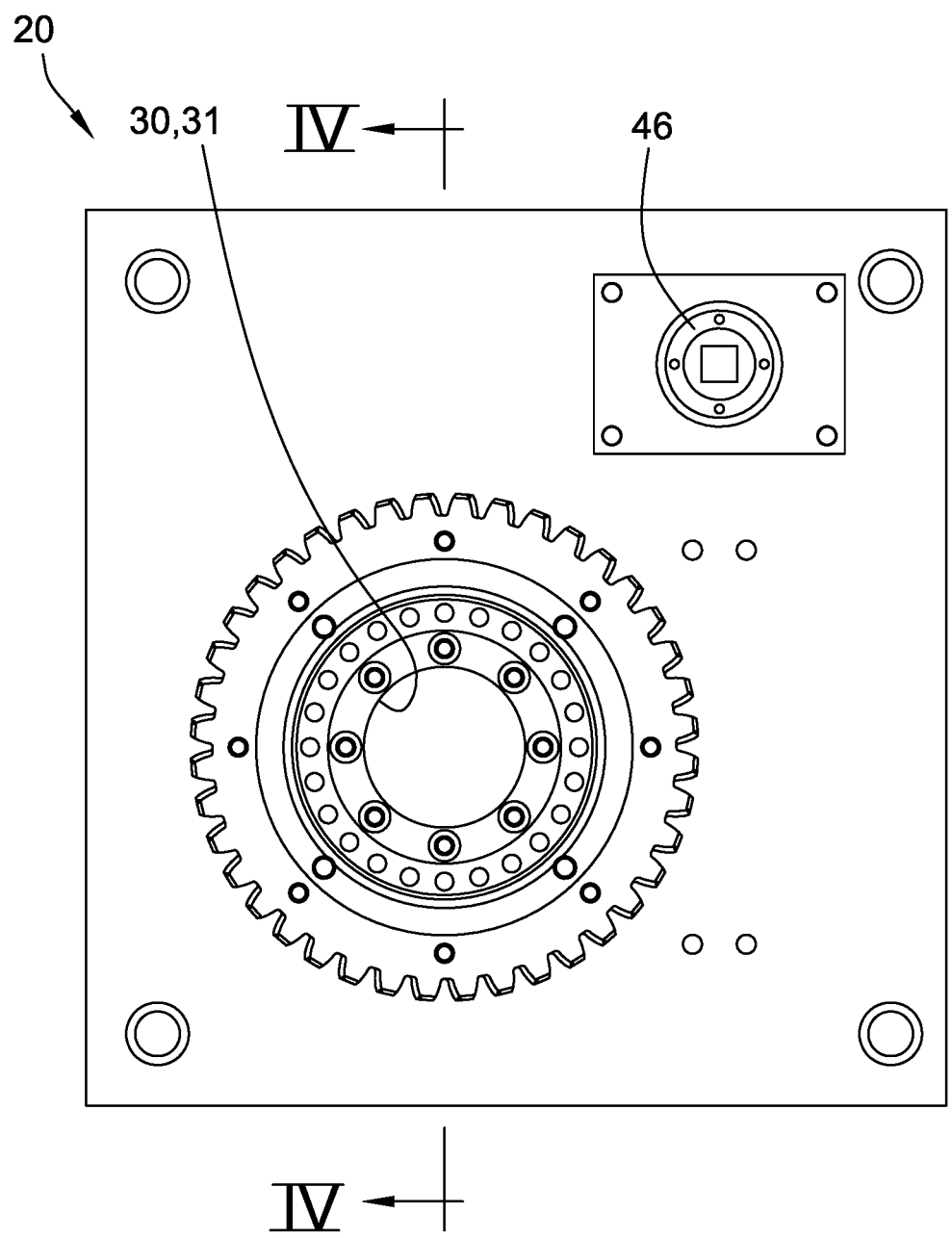
FIG. 3 is an end elevational view of the constrictor valve of FIG. 1, showing for illustrative purposes components of a webbing constriction assembly and a drive mechanism of the constrictor valve not otherwise visible from the end.

Referring to FIGS. 1 and 2, the constrictor housing 22 defines a first conduit opening 30 and a second conduit opening 31. The first and second conduit openings 30, 31 are in spaced relationship to each other along a longitudinal axis LA defined therebetween. The resiliently flexible conduit 21 extends through the first and second conduit openings 30, 31. In embodiments, the size of the first and second conduit openings 30, 31 can be varied to accommodate a conduit with a different cross-sectional size.

In the illustrated embodiment, the constrictor housing 22 includes a first end plate 34, a second end plate 35, and a plurality of stretchers 37. The stretchers 37 extend along the longitudinal axis LA and are connected to the first and second end plates 34, 35. In the illustrated embodiment, the stretchers 37 are connected to the first and second end plates 34, 35 via threaded fasteners 39 secured through the first and second end plates 34, 35 into the respective ends of the stretchers 37. In embodiments, any suitable technique can be used to connect the stretchers 37 to the first and second end plates 34, 35.

The illustrated embodiment includes four stretchers 37. In other embodiments, a different umber of stretchers 37 can be used. In embodiments, the length of the stretchers 37 can be varied to change the size of the constrictor housing 22 along the longitudinal axis LA.

The first and second end plates 34, 35 are mirror images of each other. Accordingly, it should be understood that the description of one end plate is applicable to the other end plate, as well. The first and second end plates 34, 35 respectively define the first and second conduit openings 30, 31 (see FIGS. 3 and 4, as well). The first and second end plates 34, 35 also each define a shaft opening 41 therethrough to accommodate the drive mechanism 27.

In the illustrated embodiment, the constrictor housing 22 also includes a first shaft bearing support 43 and a second shaft bearing support 44. The first and second shaft bearing supports 43, 44 are respectively connected to the first and second end plates 34, 35. In embodiments, the first and second shaft bearing supports 43, 44 house a shaft bearing 46 therein. In the illustrated embodiment, the first and second shaft bearing supports 43, 44 are substantially the same. Each shaft bearing support 43, 44 includes an outer shaft bearing 46 connected to the respective end plate 34, 35 and an inner shaft bearing 47 connected to the respective end plate 34, 35 via a pair of shaft support walls 48.

Figure 4:
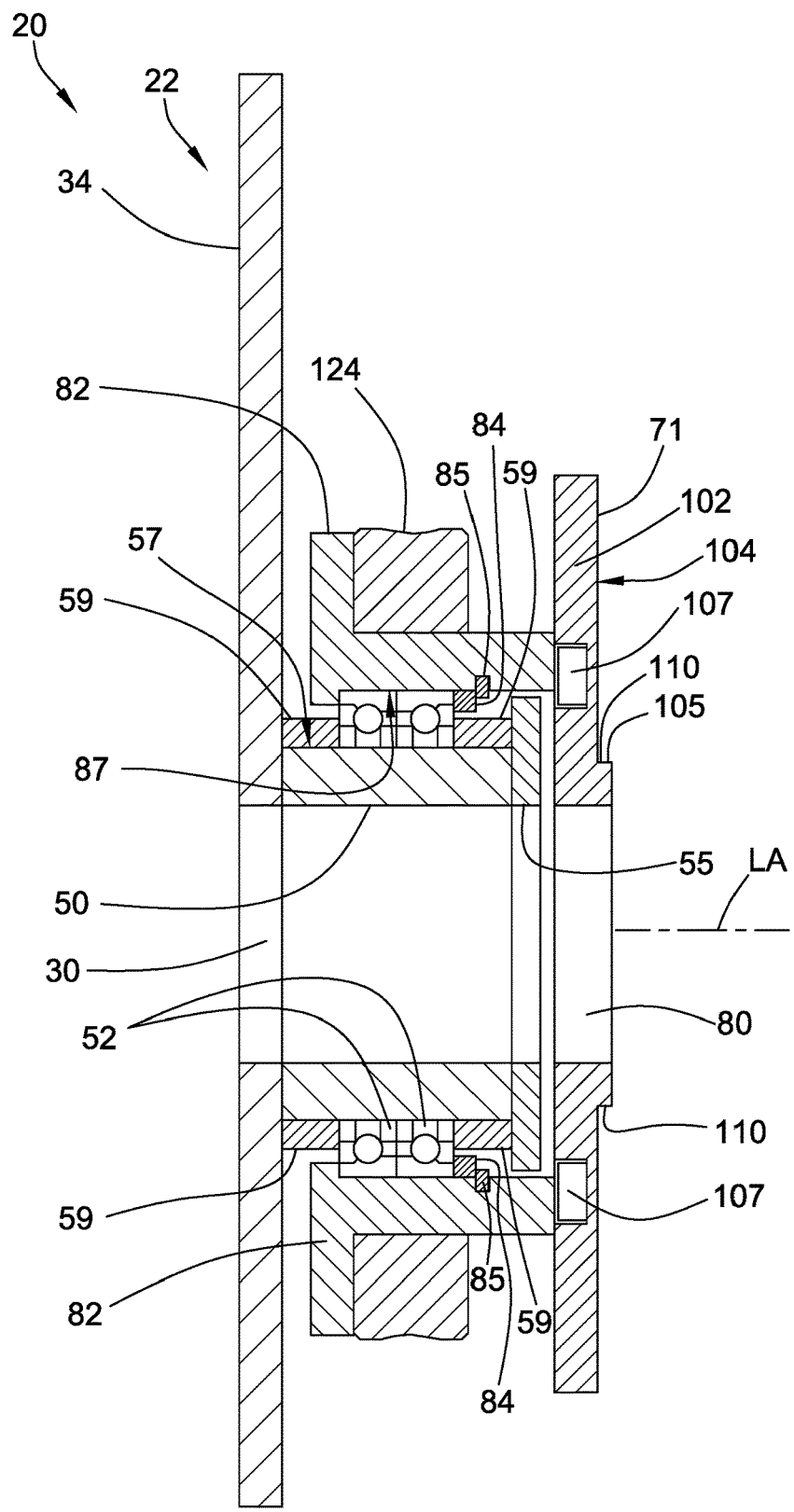
FIG. 4 is an enlarged, cross-sectional view of the constrictor valve of FIG. 1 take along line IV-IV in FIG. 3.

Referring to FIG. 4, the first end plate 34 of the constrictor housing 22 is shown. The constrictor housing 22 includes a first bearing mounting ring 50 which is connected to the first end plate 34 such that the first bearing mounting ring 50 circumscribes the first conduit opening 30. In embodiments, the first bearing mounting ring 50 rotatably supports at least one rotatable member bearing 52.

In the illustrated embodiment, a pair of rotatable member bearings 52 is mounted to the first bearing mounting ring 50. The first bearing mounting ring 50 has a first bearing flange ring 55 mounted thereto such that the bearing flange ring 55 extends radially outwardly from an exterior circumferential surface 57 of the first bearing mounting ring 50. A pair of bearing spacers 59 is in flanking relationship with the pair of rotatable member bearings 52 such that the rotatable member bearings 52 are disposed between the bearing spacers 59. The bearing spacers 59 are annular. One bearing spacer 59 is axially disposed between the first end plate 34 and the rotatable member bearings 52, and the other bearing spacer 59 is axially disposed between the rotatable member bearings 52 and the bearing flange ring 55.

The second end plate 35 has a similar arrangement. Accordingly, the constrictor housing 22 includes a second bearing mounting ring which is connected to the second end plate 35 such that the second bearing mounting ring circumscribes the second conduit opening 31. In embodiments, the second bearing mounting ring rotatably supports at least one rotatable member bearing. In the illustrated embodiment, a pair of rotatable member bearings is mounted to the second bearing mounting ring. The second bearing mounting ring has a second bearing flange ring mounted thereto such that the second bearing flange ring extends radially outwardly from an exterior circumferential surface of the second bearing mounting ring. A pair of annular bearing spacers is in flanking relationship with the pair of rotatable member bearings mounted to the second bearing mounting ring such that the rotatable member bearings are disposed between the bearing spacers. One bearing spacer is axially disposed between the second end plate 35 and the rotatable member bearings, and the other bearing spacer is axially disposed between the rotatable member bearings and the second bearing flange ring.

In embodiments, the first and second end plates 34, 35 and the respective first and second bearing mounting rings 50 can be integrally constructed. In embodiments, the first and second bearing mounting rings 50 and the respective first and second bearing flange rings 55 can be integrally constructed. In embodiments, the end plates 34, 35, the bearing mounting rings 50, and the bearing flange rings 55 can be respectively integrally constructed.

Any suitable material can be used for the various components of the constrictor housing 22. For example, in embodiments, components of the constrictor housing 22 are made from a suitable metal.

Referring to FIGS. 1 and 2, the webbing constriction assembly 25 includes a first rotatable member 71, a second rotatable member 72, and a plurality of webbing straps 74, 75, 76, 77. The first and second rotatable members 71, 72 are rotatably mounted to the constrictor housing 22 such that the first and second rotatable members 71, 72 are rotatable about the longitudinal axis LA. The first and second rotatable members 71, 72 are in spaced relationship to each other along the longitudinal axis LA. The webbing straps 74, 75, 76, 77 are connected to the first and second rotatable members 71, 72. The webbing straps 74, 75, 76, 77 are wrapped around the conduit 21. In the illustrated embodiment, the webbing straps 74, 75, 76, 77 are circumferentially disposed around the flexible conduit 21, circumscribing the flexible conduit 21 in spaced relation to each other along the longitudinal axis LA in a woven relationship.

Referring to FIGS. 1, 2, and 4, the first rotatable member 71 is rotatably supported by the first bearing mounting ring 50 such that at least one rotatable member bearing rotatably supports the first rotatable member 71. The second rotatable member 72 is rotatably supported by the second bearing mounting ring such that at least one rotatable member bearing rotatably supports the second rotatable member 71.

The first and second rotatable members 71, 72 are mirror images of each other. Accordingly, it will be understood that the description of one rotatable member is applicable to the other rotatable member, as well.

Referring to FIG. 4, the first rotatable member 71 defines a central conduit opening 80 configured to accommodate the conduit 21 therethrough. The first rotatable member 71 includes a first bearing cover ring 82. The first bearing cover ring 82 is in radially outward relationship to the first bearing mounting ring 50 with at least one rotatable member bearing 52 being radially interposed therebetween. A bearing cover spacer 84 and a retaining ring 85 are provided to help define a circumferential inner groove 87 between the first bearing cover ring 82 and the bearing cover spacer 84 within which the rotatable member bearings 52 are retentively disposed.

In a similar fashion, the second rotatable member 72 defines a central conduit opening and includes a second bearing cover ring that is in radially outward relationship to the second bearing mounting ring with at least one rotatable member bearing 52 being radially interposed therebetween. A similar spacer and retainer ring arrangement can also be provided for the second bearing cover ring to retentively capture the rotatable member bearings 52.

Referring to FIGS. 1 and 2, the webbing straps 74, 75, 76, 77 are wrapped around the conduit such that the webbings straps 74, 75, 76, 77 are in interwoven relationship with each other. In the illustrated embodiment, the webbing constriction assembly 25 includes four webbing straps 74, 75, 76, 77. In other embodiments, a different number of webbing straps can be used.

In the illustrated embodiment, each webbing strap 74, 75, 76, 77 is wrapped around the conduit 21 approximately one time (360 degrees) when it is in a nominal position, as shown in FIGS. 1 and 2. In embodiments, the wrapping relationship of the webbing straps 74, 75, 76, 77 around the conduit 21 can be varied. The webbing straps 74, 75, 76, 77 are configured to exert pressure upon the conduit 21 to thereby constrict a slurry passage defined within the conduit. The webbing straps 74, 75, 76, 77 are circumferentially arrayed around the conduit 21 and are configured to impart pressure on and constrict the conduit 21 when they are placed in tension. The webbing straps 74, 75, 76, 77 can be placed in tension by rotating the first and second rotatable members 71, 72 in opposing winding directions $WD_1$, $WD_2$.

The webbing straps 74, 75, 76, 77 can be made from any suitable material, such as nylon or polyester, for example. The webbing straps 74, 75, 76, 77 are preferably flexible, but resistant to tension force applied axially along the webbing strap 74, 75, 76, 77. It will be appreciated that, in different embodiments, different materials, lengths, and sizes of webbing straps can be used to suit the intended application.

The webbing straps 74, 75, 76, 77 are substantially identical to each other, and each has a first end 91 and a second end 92. The first end 91 of each webbing strap 74, 75, 76, 77 is connected to the first rotatable member 71 with at least two degrees of freedom, and the second end 92 of each webbing strap 74, 75, 76, 77 is connected to the second rotatable member 72 with at least two degrees of freedom. In the illustrated embodiment, the first end 91 of each webbing strap 74, 75, 76, 77 is movably connected to the first rotatable member 71, and the second end 92 of each webbing strap 74, 75, 76, 77 is movably connected to the second rotatable member 72.

In the illustrated embodiment, the first and second ends 91, 92 of each webbing strap 74, 75, 76, 77 is connected to the respective first and second rotatable members 71, 72 via an attachment base 94 and an attachment fork 95. Each attachment base 94 is connected to one of the first and second rotatable members 71, 72. Each attachment fork 95 is pivotally mounted to one of the attachment bases 94 such that the attachment fork 95 is rotatable with respect to the attachment base 94 about a fork pivot axis FPA. The first end 91 of each webbing strap 74, 75, 76, 77 is pivotally mounted to one of the attachment forks 95 such that each webbing strap 74, 75, 76, 77 is rotatable with respect to the attachment fork 95 about a webbing strap pivot axis WPA. The webbing strap pivot axis WPA is perpendicular to the fork pivot axis FPA. Each attachment fork 95 includes a pair of arms 97 and a fork pin 98 extending between the arms 97. The fork pin 98 defines the webbing strap pivot axis WPA. Each first end 91 of the webbing straps 74, 75, 76, 77 comprises a closed loop. The fork pin 98 extends through the closed loop of the first end 91 of the respective webbing strap 74, 75, 76, 77. The second end 92 of each webbing strap 74, 75, 76, 77 has a similar construction and attachment arrangement.

It will further be appreciated that during the relative rotating action of the first and second rotatable members 71, 72, the webbing straps 74, 75, 76, 77 change in orientation with respect to the first and second rotatable members 71, 72. After relative rotation of the first and second rotatable members 71, 72, each webbing strap 74, 75, 76, 77 is skewed from the nominal position shown in FIGS. 1 and 2.

Referring to FIG. 4, the first rotatable member 71 includes a plate portion 102 having a plate surface 104, a mounting ledge 105, a plurality of tracks 107, and a plurality of connectors 108 (see FIG. 2). The mounting ledge 105 projects from the plate surface. Each track 107 is connected to the plate portion 102. In embodiments, at least one of the attachment bases 94 is disposed in contacting relationship with the mounting ledge 105 and is adjustably secured to one of the tracks 107 via a respective connector 108. In embodiments, at least one of the first ends 91 of the webbing straps 74, 75, 76, 77 is movably connected to the first rotatable member 71 via one of the attachment bases 94. In embodiments, at least one of the attachment bases 94 is disposed in contacting relationship with the mounting ledge 105 and is adjustably secured to the track 107 via a respective connector.

In embodiments, the mounting ledge 105 comprises four mounting ledge segments 110 (two of which are shown in FIG. 4) forming a square that circumscribes the central conduit opening 80 of the first rotatable member 71. In embodiments, the mounting ledge segments 110 can be used to vary the attachment points of the webbing straps 74, 75, 76, 77 relative to a radial center of the central conduit opening 80. In use, the attachment points of the webbing straps 74, 75, 76, 77 can be varied to accommodate conduits with different sizes and/or to generate a different wringing action from the webbing straps 74, 75, 76, 77.

Referring to FIG. 1, the drive mechanism 27 is configured to rotate the first and second rotatable members 71, 72 in opposing first and second winding directions $WD_1$, $WD_2$ about the longitudinal axis LA to wrap the webbing straps 74, 75, 76, 77 tighter around the conduit 21 to thereby compress the conduit 21 and to rotate the first and second rotatable members 71, 72 in opposing first and second unwinding directions $UD_1$, $UD_2$ about the longitudinal axis LA to loosen the wrapping of the webbing straps 74, 75, 76, 77 about the conduit 21. The first and second winding directions $WD_1$, $WD_2$ are in opposing relationship to the first and second unwinding directions $UD_1$, $UD_2$, respectively.

Upon actuation of the drive mechanism 27, such as by an actuator (a drive motor, e.g.), the drive mechanism 27 rotates the first and second rotatable members 71, 72 relative to each other in opposing winding directions $WD_1$, $WD_2$ about the longitudinal axis LA along which the conduit 21 extends. In embodiments, the circumferential displacement of the first and second rotatable members 71, 72 causes the webbing straps 74, 75, 76, 77 to undergo a wringing action to impart compressive pressure upon, and constrict, the conduit 21 such that the slurry passage underlying the webbing straps 74, 75, 76, 77 approximates a hyperboloid of rotation. In embodiments, the webbing straps 74, 75, 76, 77 exert pressure upon the conduit 21 along the length of the conduit 21 in multiple radial planes to thereby constrict the underlying slurry passage radially. The resulting shape of the slurry passage within the segment of the conduit 21 disposed within the constrictor housing 22 is generally smooth and circular at a plurality of cross-sections taken along the length of the segment of the conduit 21.

The illustrated drive mechanism 27 includes a drive shaft 110 and a gear assembly 112. The drive shaft 110 defines a shaft axis SA. The drive shaft 110 is rotatably movable about the shaft axis SA in a tighten direction TD and a loosen direction LD. The loosen direction LD is in opposing relationship to the tighten direction TD. The gear assembly 112 is arranged with the drive shaft 110 and the first and second rotatable members 71, 72 such that the gear assembly 112 is configured to rotate the first and second rotatable members 71, 72 in the opposing first and second winding directions $WD_1$, $WD_2$ about the longitudinal axis LA in response to the drive shaft 110 rotating in the tighten direction TD and to rotate the first and second rotatable members 71, 72 in the opposing first and second unwinding directions $UD_1$, $UD_2$ about the longitudinal axis LA in response to the drive shaft 110 rotating in the loosen direction LD.

The drive shaft 110 of the drive mechanism 27 extends through the shaft opening 41 of both of the first and second end plates 34, 35. The drive shaft 110 extends through the first and second shaft bearing supports 43, 44 such that the shaft bearings 46, 47 rotatably support the drive shaft 110 such that the drive shaft 110 is rotatable about the shaft axis SA.

The gear assembly 112 of the drive mechanism 27 includes first and second drive gears 121, 122, first and second ring gears 124, 125, and first and second worm gear assemblies 127, 128. The first and second drive gears 121, 122 are mounted to the drive shaft 110 in spaced relationship to each other along the shaft axis SA. The first and second ring gears 124, 125 are in fixed connection with the first and second rotatable members 71, 72, respectively. The first and second worm gear assemblies 127, 128 are supported by the constrictor housing 22. The first worm gear assembly 127 is interposed between, and enmeshingly engaged with, the first drive gear 121 and the first ring gear 124 such that the first drive gear 121 engages the first worm gear assembly 127 and, in response, the first worm gear assembly 127 engages the first ring gear 124 to rotate the first rotatable member 71 in the first winding direction $WD_1$ when the drive shaft 110 rotates in the tighten direction TD and to rotate the first rotatable member 71 in the first unwinding direction $UD_1$ when the drive shaft 110 rotates in the loosen direction LD. The second worm gear assembly 128 is interposed between, and enmeshingly engaged with, the second drive gear 122 and the second ring gear 125 such that the second drive gear 122 engages the second worm gear assembly 128 and, in response, the second worm gear assembly 128 engages the second ring gear 125 to rotate the second rotatable member 72 in the second winding direction $WD_2$ when the drive shaft 110 rotates in the tighten direction TD and to rotate the second rotatable member 72 in the second unwinding direction $UD_2$ when the drive shaft 110 rotates in the loosen direction LD.

In the illustrated embodiment, the second drive gear 121 is movably mounted to the drive shaft 110 such that the second drive gear 121 is repositionable along the shaft axis SA. The second shaft bearing support 44 is translatably movable along the shaft axis SA of the drive shaft 110 to vary the longitudinal distance between the first and second shaft bearing supports 43, 44.

A coupling 130 is mounted to the drive shaft 110 to facilitate the connection of an actuator, such as a drive motor, for example, thereto. In embodiments, the drive shaft 110 can be driven by any suitable motor, such as a servo-motor, for example. The actuator can be configured to rotate both the first and second rotatable members 71, 72 relative to each other such that the amount of relative rotation between the first and second rotatable members 71, 72 of the constrictor valve 20 is continuously variable. In embodiments, the actuator can be either manually or automatically controlled.

In embodiments, the actuator can be operated via a controller which is also in electrical communication with a sensor, such as a pressure sensor. The controller can be configured to control the operation of the actuator via a feedback loop including at least one sensor. Constriction of the valve 20 can be triggered by the controller sensing one or a plurality of factors, such as the pressure of the slurry being dispensed from the discharge outlet with which the conduit is in fluid communication. To increase or decrease this pressure to a desired amount, the pressure drop through the slurry passage underlying the constrictor valve 20 can be variably increased or reduced by constricting the conduit 21 through operation of the actuator to either rotate the first and second rotatable members 71, 72 in the opposing winding directions $WD_1$, $WD_2$ or unwinding directions $UD_1$, $UD_2$, respectively. In embodiments, the flow rate through the conduit 21, the pressure in the mixing or dispensing system, the viscosity of the slurry, the electromotive loading on the actuator or the mixer motor, or other factors can be used.

Figure 5:
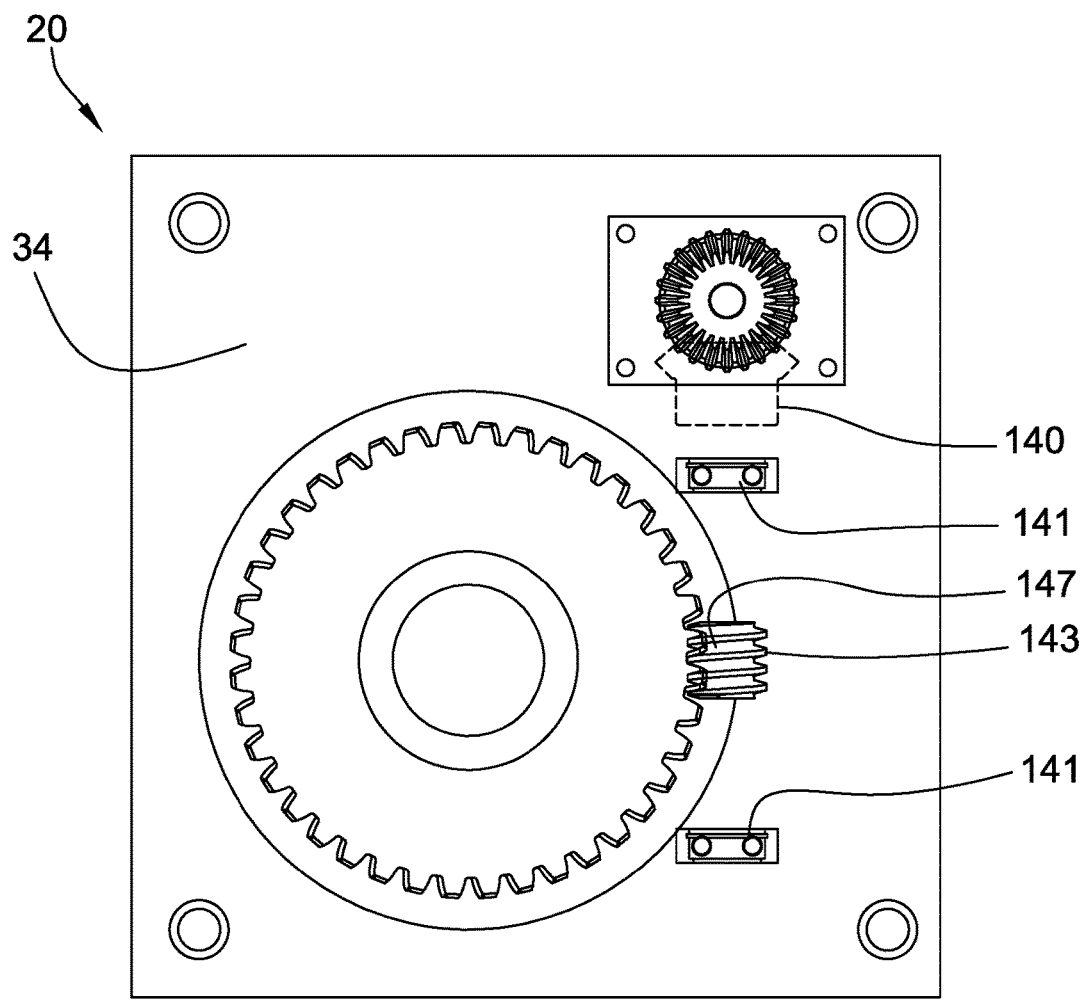
FIG. 5 is an end elevational view of the constrictor valve of FIG. 1 as in FIG. 3, but showing for illustrative purposes components of a worm gear assembly of the drive mechanism of the constrictor valve not otherwise visible from the end.
Figure 6:
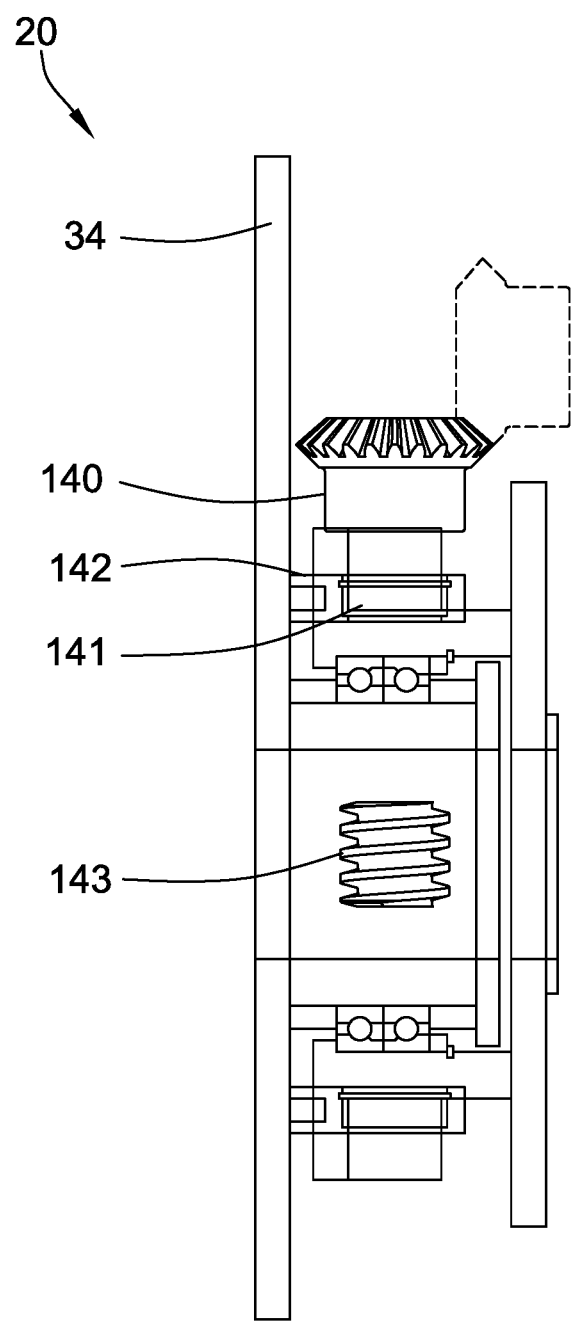
FIG. 6 is a fragmentary side elevational view of the constrictor valve of FIG. 1, showing components of the worm gear assembly.

Referring to FIGS. 5 and 6, the first worm gear assembly 127 includes a drive gear engaging bevel gear 140, a pair of worm gear bearings 141 respectively disposed within a worm gear bearing housing 142 mounted to the first end plate 34, a worm gear 143, and a worm gear shaft 145 which is fixed in place on a worm gear shaft 145 (see FIG. 2). The worm gear 143 can be fixed in place via a key 147. The second worm gear assembly 128 has a construction similar to the first worm gear assembly 127.

In embodiments, a constrictor valve constructed according to principles of the present disclosure can be associated with a discharge conduit of a conventional gypsum slurry mixer (e.g., a pin mixer) as is known in the art. The constrictor valve can be used with components of a conventional discharge conduit. For example, the constrictor valve can be used with components of a gate-canister-boot arrangement as known in the art or of the discharge conduit arrangements described in U.S. Pat. Nos. 6,494,609; 6,874,930; 7,007,914; and 7,296,919.

A constrictor valve constructed in accordance with principles of the present disclosure can advantageously be configured as a retrofit in an existing wallboard manufacturing system. For example, a constrictor valve constructed in accordance with principles of the present disclosure can be retrofitted to an existing slurry discharge conduit arrangement, such as that shown in U.S. Pat. No. 6,874,930 or 7,007,914, for example.

In embodiments, a slurry dispensing apparatus constructed in accordance with principles of the present disclosure can be placed in fluid communication with a slurry mixer to produce a cementitious slurry. In one embodiment, a slurry mixing and dispensing assembly includes a mixer and a slurry dispensing apparatus.

In embodiments, a mixing apparatus for mixing and dispensing a slurry includes a mixer having a mixer motor and a housing configured for receiving and mixing the slurry. The housing defines a chamber for holding the slurry, and can have a generally cylindrical shape. The housing can have an upper wall, a lower wall, and an annular peripheral wall. Calcined gypsum and water, as well as other materials or additives often employed in slurries to prepare gypsum products, can be mixed in the mixing apparatus. An outlet, also referred to as a mixer outlet, a discharge gate or a slot, can be provided in the peripheral wall for the discharge of the major portion of the cementitious slurry into a dispensing apparatus. The dispensing apparatus can include a cylindrical flexible, resilient tube or conduit having a main inlet in slurry receiving communication with the mixer outlet and a constrictor valve constructed according to principles of the present disclosure.

Figure 7:
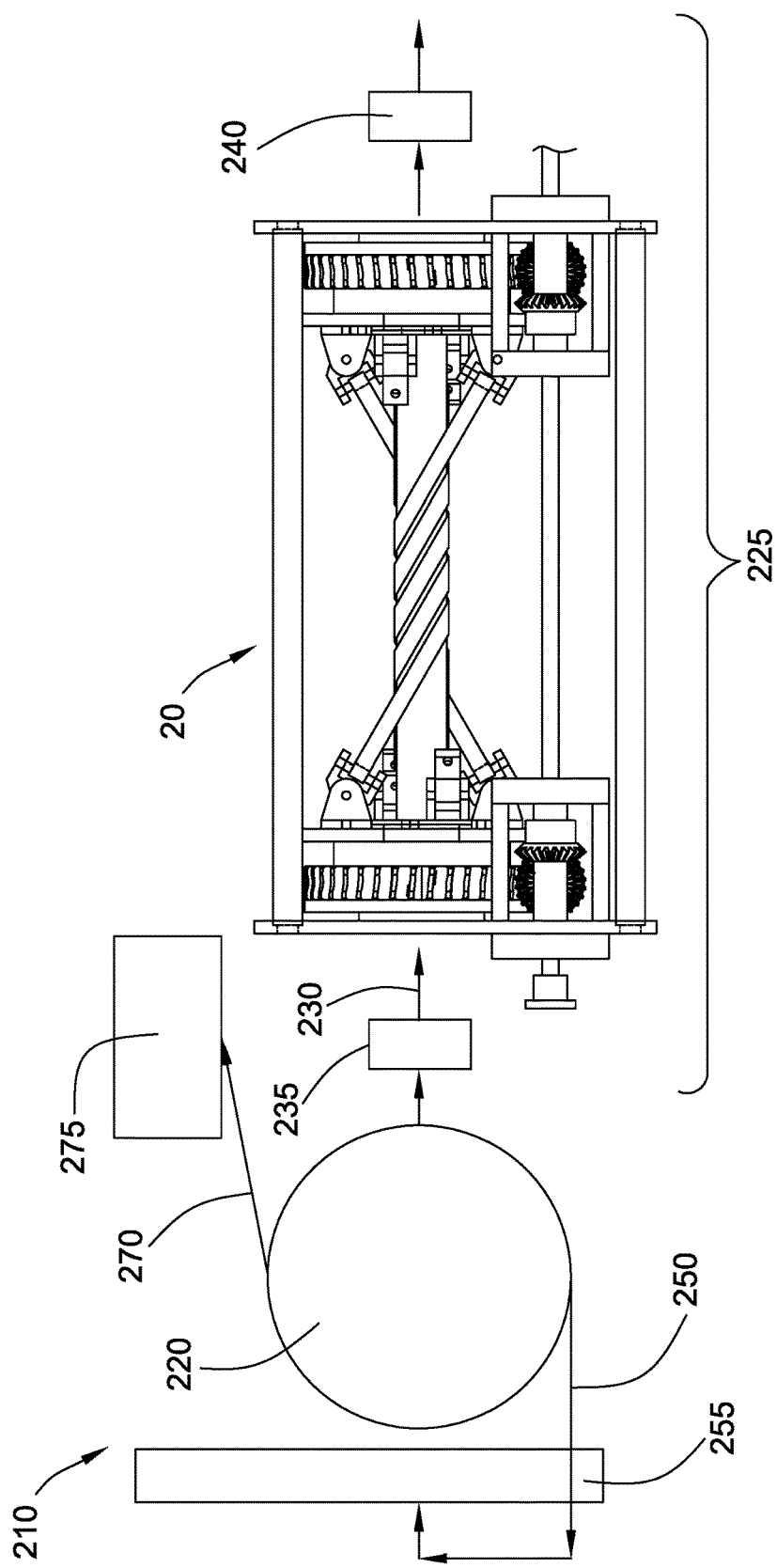
FIG. 7 is a schematic plan diagram of an embodiment of a cementitious slurry mixing and dispensing assembly, including an embodiment of a constrictor valve constructed in accordance with principles of the present disclosure.

Referring to FIG. 7, an embodiment of a cementitious slurry mixing and dispensing assembly 210 constructed in accordance with principles of the present disclosure is shown. The cementitious slurry mixing and dispensing assembly 210 includes a slurry mixer 220 in fluid communication with a slurry dispensing apparatus 225.

The slurry mixer 220 is adapted to agitate water and a cementitious material to form aqueous cementitious slurry. Both the water and the cementitious material can be supplied to the mixer 220 via one or more inlets as is known in the art. In embodiments, any other suitable slurry additive can be supplied to the mixer 220 as is known in the art of manufacturing cementitious products. Any suitable mixer (e.g., a pin mixer) can be used with the slurry distribution system.

The mixer 220 includes a housing and an agitator disposed within the housing. The housing has an outlet. The agitator is configured to agitate water and a cementitious material to form an aqueous cementitious slurry.

The slurry dispensing apparatus 225 includes an elongate resiliently flexible resilient conduit 230, a constrictor valve 20 similar in construction and functionality as the constrictor valve 20 of FIG. 1, and a slurry distributor 240. The conduit 230 defines a slurry passage. The conduit 230 is connected to the mixer 220 such that the slurry passage is in fluid communication with the outlet. The constrictor valve 20 is mounted to the conduit 230. The slurry distributor 240 is in fluid communication with the conduit 230 and can be any conventional distributor known to those skilled in the art (such as a "boot," for example).

A foam injection system 235 can be arranged with at least one of the mixer 220 and the discharge conduit 230. The foam injection system 235 can include a foam source (e.g., such as a foam generation system configured as known in the art) and a foam supply conduit.

In embodiments, any suitable foam source can be used. Preferably, the aqueous foam is produced in a continuous manner in which a stream of a mix of foaming agent and water is directed to a foam generator, and a stream of the resultant aqueous foam leaves the generator and is directed to and mixed with the cementitious slurry.

An aqueous foam supply conduit can be in fluid communication with at least one of the slurry mixer 220 and the discharge conduit 230. An aqueous foam from a source can be added to the constituent materials through the foam supply conduit at any suitable location downstream of the mixer and/or in the mixer itself to form a foamed cementitious slurry that is provided to the slurry distributor 240. In the illustrated embodiment, the foam supply conduit is disposed downstream of the slurry mixer and is associated with the discharge conduit 230. In the illustrated embodiment, the aqueous foam supply conduit has a manifold-type arrangement for supplying foam to a plurality of foam injection ports defined within an injection ring or block associated with the delivery conduit, as described in U.S. Pat. No. 6,874,930, for example.

In other embodiments, one or more foam supply conduits can be provided that is in fluid communication with the mixer 220. In yet other embodiments, the aqueous foam supply conduit(s) can be in fluid communication with the slurry mixer alone. As will be appreciated by those skilled in the art, the means for introducing aqueous foam into the cementitious slurry in the cementitious slurry mixing and dispensing assembly, including its relative location in the assembly, can be varied and/or optimized to provide a uniform dispersion of aqueous foam in the cementitious slurry to produce board that is fit for its intended purpose.

Any suitable foaming agent can be used. Preferably, the aqueous foam is produced in a continuous manner in which a stream of the mix of foaming agent and water is directed to a foam generator, and a stream of the resultant aqueous foam leaves the generator and is directed to and mixed with the slurry. Some examples of suitable foaming agents are described in U.S. Pat. Nos. 5,683,635 and 5,643,510, for example.

One or more additional flow-modifying elements can be associated with the discharge conduit 230 and configured to control the flow of aqueous cementitious slurry from the slurry mixer 220. Examples of suitable flow-modifying elements include volume restrictors, pressure reducers, canisters, etc., including those described in U.S. Pat. Nos. 6,494,609; 6,874,930; 7,007,914; and 7,296,919, for example.

As one of ordinary skill in the art will appreciate, one or both of the webs of cover sheet material can be pre-treated with a very thin relatively denser layer of gypsum slurry (relative to the gypsum slurry comprising the core), often referred to as a skim coat in the art, and/or hard edges, if desired. To that end, the mixer includes a first auxiliary conduit 250 that is adapted to deposit a stream of dense aqueous calcined gypsum slurry that is relatively denser than the first and second flows of aqueous calcined gypsum slurry delivered to the slurry distributor (i.e., a "face skim coat/ hard edge stream"). The first auxiliary conduit 250 can deposit the face skim coat/hard edge stream upon a moving web of cover sheet material upstream of a skim coat roller 255 that is adapted to apply a skim coat layer to the moving web of cover sheet material and to define hard edges at the periphery of the moving web by virtue of the width of the roller being less than the width of the moving web as is known in the art. Hard edges can be formed from the same dense slurry that forms the thin dense layer by directing portions of the dense slurry around the ends of the roller used to apply the dense layer to the web.

The mixer can also include a second auxiliary conduit 270 adapted to deposit a stream of dense aqueous calcined gypsum slurry that is relatively denser than the first and second flows of aqueous calcined gypsum slurry delivered to the slurry distributor (i.e., a "back skim coat stream"). The second auxiliary conduit 270 can deposit the back skim coat stream upon a second moving web of cover sheet material upstream (in the direction of movement of the second web) of a skim coat roller 275 that is adapted to apply a skim coat layer to the second moving web of cover sheet material as is known in the art (see FIG. 19 also).

In other embodiments, separate auxiliary conduits can be connected to the mixer to deliver one or more separate edge streams to the moving web of cover sheet material. Other suitable equipment (such as auxiliary mixers) can be provided in the auxiliary conduits to help make the slurry therein denser, such as by mechanically breaking up foam in the slurry and/or by chemically breaking down the foam through use of a suitable de-foaming agent. In embodiments, a constrictor valve constructed according to principles of the present disclosure can be mounted to one or more of the auxiliary conduits 250, 270 of the mixer 220.

In one embodiment of a method of making a cementitious product, water and a cementitious material are agitated in a mixer to form an aqueous cementitious slurry. A flow of the aqueous cementitious slurry is discharged from the mixer into a slurry passage defined within a conduit. A portion of the conduit is constricted using a constrictor valve to change at least a part of the shape of the slurry passage within the portion of the conduit. The constrictor valve includes a constrictor housing, a webbing constriction assembly, and a drive mechanism.

The constrictor housing defines a first conduit opening and a second conduit opening. The first and second conduit openings are in spaced relationship to each other along a longitudinal axis defined therebetween. The conduit extends through the first and second conduit openings.

The webbing constriction assembly includes a first rotatable member, a second rotatable member, and a plurality of webbing straps. The first and second rotatable members are rotatably mounted to the constrictor housing such that the first and second rotatable members are rotatable about the longitudinal axis. The first and second rotatable members are in spaced relationship to each other along the longitudinal axis. The webbing straps are connected to the first and second rotatable members. The webbing straps are wrapped around the conduit.

The drive mechanism is configured to rotate the first and second rotatable members in opposing first and second winding directions about the longitudinal axis and to rotate the first and second rotatable members in opposing first and second unwinding directions about the longitudinal axis. The first and second winding directions are in opposing relationship to the first and second unwinding directions, respectively. The constricting of the portion of the conduit is effected by operating the drive mechanism to rotate the first and second rotatable members in the opposing first and second winding directions to wrap the webbing straps tighter around the conduit to thereby compress the conduit.

In embodiments, the pressure of the flow of the aqueous cementitious slurry discharged from the mixer is monitored. In response to the pressure sensed at the outlet of the mixer, the constrictor valve is adjusted to vary the degree to which the portion of the conduit is constricted. In embodiments, if the pressure of the flow of the aqueous cementitious slurry discharged from the mixer is below a predetermined pressure range, the drive mechanism of the constrictor valve is operated to further rotate the first and second rotatable members in the opposing first and second winding directions to further wrap the webbing straps even tighter around the conduit to thereby further compress the conduit. In embodiments, if the pressure of the flow of the aqueous cementitious slurry discharged from the mixer is above the predetermined pressure range, the drive mechanism of the constrictor valve is operated to rotate the first and second rotatable members in the opposing first and second unwinding directions to loosen the grip of the webbing straps around the conduit to allow the slurry passage underlying the portion of the conduit to radially expand by an amount correlated to the degree to which the compression action exerted by the webbing straps diminished.

In embodiments, the flow of cementitious slurry from the mixer comprises a main flow of cementitious slurry, and the conduit comprises a main discharge conduit. In other embodiments, the flow of cementitious slurry from the mixer comprises an auxiliary flow of cementitious slurry, and the conduit comprises an auxiliary discharge conduit. In at least some of such embodiments, the method further includes discharging a main flow of cementitious slurry from the mixer into a main discharge conduit. The main flow of cementitious slurry has a first volumetric flow rate, and the auxiliary flow of cementitious slurry has a second volumetric flow rate. The first volumetric flow rate is greater than the second volumetric flow rate.

All references cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A constrictor valve for selectively constricting a resiliently flexible conduit in a gypsum slurry dispensing apparatus, the constrictor valve comprising:
   a constrictor housing, the constrictor housing defining a first conduit opening and a second conduit opening, the first and second conduit openings in spaced relationship to each other along a longitudinal axis defined therebetween;
   a webbing constriction assembly, the webbing constriction assembly including a first rotatable member, a second rotatable member, and a plurality of webbing straps, the first and second rotatable members being rotatably mounted to the constrictor housing such that the first and second rotatable members are rotatable about the longitudinal axis, the first and second rotatable members being in spaced relationship to each other along the longitudinal axis, the webbing straps connected to the first and second rotatable members; and
   a drive mechanism, the drive mechanism including a drive shaft and a gear assembly, the drive shaft defining a shaft axis, the drive shaft rotatably movable about the shaft axis in a tighten direction and a loosen direction, the loosen direction being in opposing relationship to the tighten direction, the gear assembly arranged with the drive shaft and the first and second rotatable members such that the gear assembly is configured to rotate the first and second rotatable members in opposing first and second winding directions about the longitudinal axis in response to the drive shaft rotating in the tighten direction and to rotate the first and second rotatable members in opposing first and second unwinding directions about the longitudinal axis in response to the drive shaft rotating in the loosen direction, the first and second winding directions being in opposing relationship to the first and second unwinding directions, respectively.

2. The constrictor valve of claim 1, wherein the constrictor housing includes a first end plate, a second end plate, and a plurality of stretchers, the first and second end plates respectively defining the first and second conduit openings, and the stretchers extending along the longitudinal axis and being connected to the first and second end plates.

3. The constrictor valve of claim 2, wherein the constrictor housing includes a first bearing mounting ring, a second bearing mounting ring, and a plurality of rotatable member bearings, the first and second bearing mounting rings respectively connected to the first and second end plates such that the first and second bearing mounting rings circumscribe the first and second conduit openings, respectively, and the first and second bearing mounting rings respectively rotatably supporting at least one rotatable member bearing, the first and second rotatable members being rotatably supported, respectively, by the first and second bearing mounting rings such that at least one rotatable member bearing rotatably supports the respective first and second rotatable members.

4. The constrictor valve of claim 3, wherein the first and second rotatable members include a first bearing cover ring and a second bearing cover ring, respectively, the first bearing cover ring in radially outward relationship to the first bearing mounting ring with at least one rotatable member bearing being radially interposed therebetween, and the second bearing cover ring in radially outward relationship to the second bearing mounting ring with at least one rotatable member bearing being radially interposed therebetween.

5. The constrictor valve of claim 2, wherein the first and second end plates each define a shaft opening therethrough, the drive shaft of the drive mechanism extending through the shaft opening of both of the first and second end plates.

6. The constrictor valve of claim 5, wherein the constrictor housing includes a first shaft bearing support and a second shaft bearing support, the first and second shaft bearing supports respectively connected to the first and second end plates, the first and second shaft bearing supports supporting a shaft bearing therein, the drive shaft extending through the first and second shaft bearing supports such that the shaft bearings rotatably support the drive shaft such that the drive shaft is rotatable about the shaft axis.

7. The constrictor valve of claim 1, wherein each of the webbing straps has a first end and a second end, the first end being connected to the first rotatable member with at least two degrees of freedom, and the second end being connected to the second rotatable member with at least two degrees of freedom.

8. The constrictor valve of claim 7, wherein each first end of the webbing straps is connected to the first rotatable member via an attachment base and an attachment fork, the attachment base being connected to the first rotatable member, the attachment fork being pivotally mounted to the attachment base such that the attachment fork is rotatable with respect to the attachment base about a fork pivot axis, the respective first end of the webbing straps being pivotally mounted to the attachment fork such that the webbing strap is rotatable with respect to the attachment fork about a webbing strap pivot axis, the webbing strap pivot axis being perpendicular to the fork pivot axis.

9. The constrictor valve of claim 8, wherein each attachment fork includes a pair of arms and a fork pin extending between the arms, the fork pin defining the webbing strap pivot axis, and each first end of the webbing straps comprises a closed loop, the fork pin extending through the closed loop of the first end of the respective webbing strap.

10. The constrictor valve of claim 8, wherein the first rotatable member includes a plate portion having a plate surface, a mounting ledge, a track, and at least one connector, the mounting ledge projecting from the plate surface, the track connected to the plate portion, and wherein at least one of the attachment bases is disposed in contacting relationship with the mounting ledge and adjustably secured to the track via a respective connector.

11. The constrictor valve of claim 1, wherein each of the webbing straps has a first end and a second end, the first end being movably connected to the first rotatable member, and the second end being movably connected to the second rotatable member.

12. The constrictor valve of claim 1, wherein the first rotatable member includes a plate portion having a plate surface, a mounting ledge, a track, and at least one connector, the mounting ledge projecting from the plate surface, the track connected to the plate portion and wherein at least one of the first ends of the webbing straps is movably connected to the first rotatable member via an attachment base, the attachment base being disposed in contacting relationship with the mounting ledge and adjustably secured to the track via a respective connector.

13. The constrictor valve of claim 1, wherein the gear assembly of the drive mechanism includes first and second drive gears, first and second ring gears, and first and second worm gear assemblies, the first and second drive gears mounted to the drive shaft in spaced relationship to each other along the shaft axis, the first and second ring gears in fixed connection with the first and second rotatable members, respectively, the first and second worm gear assemblies supported by the constrictor housing, the first worm gear assembly interposed between, and enmeshingly engaged with, the first drive gear and the first ring gear such that the first drive gear engages the first worm gear assembly and, in response, the first worm gear engages the first ring gear to rotate the first rotatable member in the first winding direction when the drive shaft rotates in the tighten direction and to rotate the first rotatable member in the first unwinding direction when the drive shaft rotates in the loosen direction, and the second worm gear assembly interposed between, and enmeshingly engaged with, the second drive gear and the second ring gear such that the second drive gear engages the second worm gear assembly and, in response, the second worm gear engages the second ring gear to rotate the second rotatable member in the second winding direction when the drive shaft rotates in the tighten direction and to rotate the second rotatable member in the second unwinding direction when the drive shaft rotates in the loosen direction.

14. The constrictor valve of claim 13, wherein the second drive gear is movably mounted to the drive shaft such that the second drive gear is repositionable along the shaft axis.

\* \* \* \* \*